No. 859,965. PATENTED JULY 16, 1907.
G. P. MORRILL.
AX AND TOOL HANDLE WEDGE.
APPLICATION FILED MAR. 14, 1907.

Witnesses.
Roy B. Tolman.
Penelope Comberbach.

Inventor
George P. Morrill.
By Rufus B. Fowler
Attorney

UNITED STATES PATENT OFFICE.

GEORGE P. MORRILL, OF CANTERBURY, NEW HAMPSHIRE.

AX AND TOOL HANDLE WEDGE.

No. 859,965.  Specification of Letters Patent.  Patented July 16, 1907.

Application filed March 14, 1907. Serial No. 362,325.

*To all whom it may concern:*

Be it known that I, GEORGE P. MORRILL, a citizen of the United States, residing at Canterbury, in the county of Merrimack and State of New Hampshire, have invented a new and useful Improvement in Ax and Tool Handle Wedges, of which the following is a specification, accompanied by drawings forming a part of the same, in which—

Figure 1:
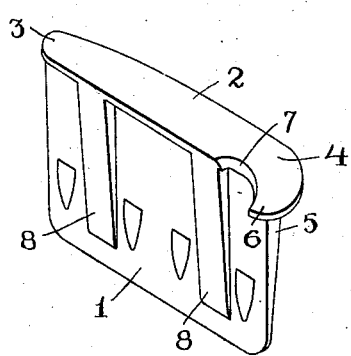
Figure 2:
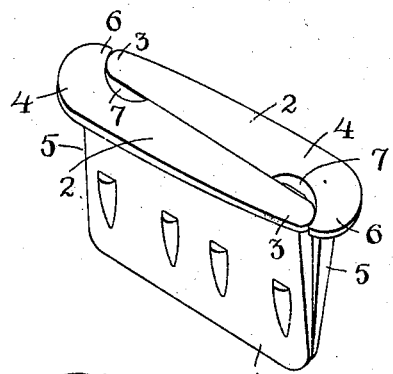
Figure 3:
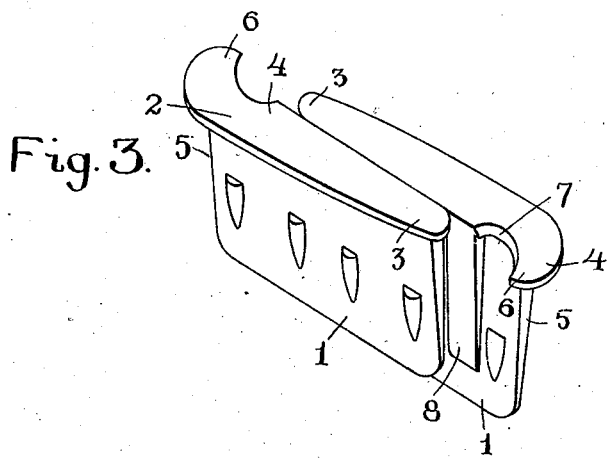
Figure 4:
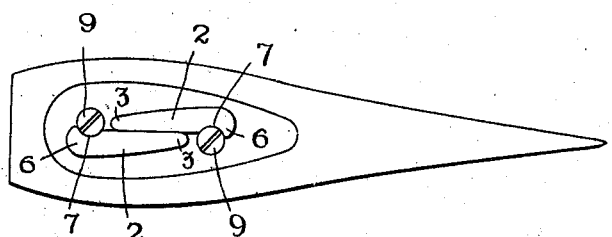

Figure 1 is a perspective view of one of the duplicate members forming one half of a completed wedge embodying my improvement. Fig. 2 is a perspective view of my improved wedge formed by placing the duplicate members side by side. Fig. 3 is a perspective view of my improved wedge with the position of the duplicate members changed from that shown in Fig. 2 in order to increase the length of the wedge, and Fig. 4 is a top view of my improved wedge applied to an ax handle, the duplicate members of the wedge being placed in the relative position shown in Fig. 3 and having attaching screws applied to the opposite ends of the wedge.

Similar reference letters and figures refer to similar parts in the different views.

The wedge forming the subject of my present invention is formed of two duplicate parts, one of which is shown in perspective view in Fig. 1, consisting of a wedge shaped blade 1 having a flanged head 2 projecting on one side from the thickest edge of the wedge. In order to make the head of the completed wedge symmetrical when the two parts of the wedge are placed together, as in Fig. 2, I form the end 3 of the flange narrower than the opposite end, and the opposite or wider end 4 I extend beyond the edge 5 of the wedge to form a hooked shaped projection 6 which, when the two parts of the wedge are placed together, incloses the narrower ends 3 of the flange, making the outline of the flanged head oval and symmetrical as shown in Fig. 2. At the base of the hooked projection 6 I form a curved and tapering recess 7 adapted to receive the head of a wood screw.

The inner surfaces of the duplicate parts of the wedge are provided with ribs 8 which serve to limit the area of contact as the two parts of the wedge are placed side by side and driven into the end of the handle. When the size of the handle requires a wedge of greater length than is formed by placing the duplicate parts together, as shown in Fig. 2, the two parts may be moved upon each other into the position shown in Figs. 3 and 4, thereby increasing the length of the wedge. When the wedge is lengthened, as shown in Figs. 3 and 4, I increase the wedging action and prevent the removal of the wedge from the handle by inserting screws 9, 9 into the handle, with their heads received in the recesses 7, 7 as shown in Fig. 4, or in place of screws heavy wire nails may be driven into the handle with their heads inclosed in the recesses 7, 7, thereby preventing the withdrawal of the wedges, and increasing the wedging action, as the insertion of the screws tend to crowd against the wedge. The action of each of the screws is wholly independent of the other, and therefore each of the two duplicate parts with their respective screws can be used in an ax or tool handle separately. As the screw or nail enters the wood wholly at one side of the wedge shaped blade, different sizes of nails or screws can be used, as it is only necessary that the screw or nail enter at the side of the blade and that a portion of its head overlap the curved recess 7. With smaller axes or tools one of the duplicate parts may be used as a single wedge either with or without a screw or nail, and for larger tools requiring a thicker wedge the two parts can be used together, while for tools or axes with a long eye the two duplicate parts may be drawn apart, thereby increasing the length of the wedge which may be used with or without screws or nails.

I claim,

1. An ax or tool handle wedge, comprising two duplicate parts, each consisting of a wedge shaped blade having at one end a flange projecting from one side and forming when the duplicate parts are placed together a symmetrical head.

2. An ax or tool handle wedge, comprising two duplicate parts, each consisting of a wedge shaped blade and a flange projecting from one side of said blade, said flange having a hook shaped extension at one end adapted to embrace the opposite end of the duplicate part.

3. An ax or tool handle wedge, comprising two duplicate parts each having a unilateral flanged head provided near one end with a curved recess for a screw or nail head.

4. An ax or tool handle wedge, comprising duplicate parts placed side by side and having raised ribs on their opposing surfaces to limit the area of contact between the two parts of the wedge.

GEORGE P. MORRILL.

Witnesses:
PENELOPE COMBERBACH,
RUFUS B. FOWLER.